United States Patent
Huo

(10) Patent No.: US 11,249,336 B2
(45) Date of Patent: Feb. 15, 2022

(54) OPTICAL CONVERSION STRUCTURE AND DISPLAY DEVICE

(71) Applicant: Shenzhen China Star Optoelectronics Semiconductor Display Technology Co., Ltd., Shenzhen (CN)

(72) Inventor: Yingdong Huo, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 285 days.

(21) Appl. No.: 16/627,391

(22) PCT Filed: Dec. 16, 2019

(86) PCT No.: PCT/CN2019/125558
§ 371 (c)(1),
(2) Date: Dec. 30, 2019

(87) PCT Pub. No.: WO2021/109222
PCT Pub. Date: Jun. 10, 2021

(65) Prior Publication Data
US 2021/0405443 A1 Dec. 30, 2021

(30) Foreign Application Priority Data
Dec. 6, 2019 (CN) .......................... 201911239864.8

(51) Int. Cl.
*G02F 1/1335* (2006.01)
*G02F 1/13357* (2006.01)

(52) U.S. Cl.
CPC .. *G02F 1/133514* (2013.01); *G02F 1/133562* (2021.01); *G02F 1/133615* (2013.01); *G02F 1/133621* (2013.01)

(58) Field of Classification Search
CPC ................................................ G02F 1/133514
See application file for complete search history.

(56) References Cited

U.S. PATENT DOCUMENTS

| | | | |
|---|---|---|---|
| 9,274,369 B1 | 3/2016 | Lee et al. | |
| 2016/0195773 A1 | 7/2016 | Lee et al. | |
| 2017/0031205 A1 | 2/2017 | Lee | |
| 2020/0081292 A1* | 3/2020 | Park | G02F 1/133512 |

FOREIGN PATENT DOCUMENTS

| | | |
|---|---|---|
| CN | 106405918 | 2/2017 |
| CN | 108761896 | 11/2018 |
| CN | 110459560 | 11/2019 |
| JP | 2017-021295 | 1/2017 |

* cited by examiner

Primary Examiner — Edmond C Lau

(57) ABSTRACT

The present invention provides an optical conversion structure and a display device. The optical conversion structure includes a base layer, a middle layer, and an optical conversion layer. The base layer has a first refractivity, the middle layer has a second refractivity, and the optical conversion layer has a third refractivity. The optical conversion layer includes a first optical conversion unit, a second optical conversion unit, and a third optical conversion unit. The first optical conversion unit, the second optical conversion unit, and the third optical conversion unit have different light colors. The second refractivity is greater than the first refractivity and the third refractivity.

16 Claims, 2 Drawing Sheets

OPTICAL CONVERSION STRUCTURE AND DISPLAY DEVICE

RELATED APPLICATIONS

This application is a National Phase of PCT Patent Application No. PCT/CN2019/125558 having International filing date of Dec. 16, 2019, which claims the benefit of priority of Chinese Patent Application No. 201911239864.8 filed on Dec. 6, 2019. The contents of the above applications are all incorporated by reference as if fully set forth herein in their entirety.

FIELD AND BACKGROUND OF THE INVENTION

The present disclosure relates to the display technology field, and more particularly, to an optical conversion structure and a display device.

At present, quantum dot display technology is developing rapidly, and display products such as backlights, color film substrates, and organic light-emitting diode display panels using quantum dots have appeared, with their core technology being quantum dot optical conversion technology. Quantum dot display uses a narrow width of an emission spectrum after optical conversion to obtain a high color gamut effect. Due to low optical conversion efficiency of quantum dots themselves, quantum dot film layers need to be set thicker (micron level) to improve optical conversion rate in devices, while absorbing excess blue light.

SUMMARY OF THE INVENTION

An embodiment of the present disclosure provides one optical conversion structure and a display device to resolve the technical problem of a thicker thickness of quantum dot film layers under the premise of satisfying a high color gamut display effect in current display products.

An embodiment of the present disclosure provides an optical conversion structure, which is used for light-emitting or/and displaying. The optical conversion structure comprises a base layer comprising a first refractivity, a middle layer disposed on the base layer and comprising a second refractivity, and an optical conversion layer, which is a light-emitting side, disposed on the middle layer and comprising a third refractivity, wherein the optical conversion layer comprises a first optical conversion unit, a second optical conversion unit, and a third optical conversion unit, and the first optical conversion unit, the second optical conversion unit, and the third optical conversion unit have different light colors. The second refractivity is greater than the first refractivity, and the second refractivity is greater than the third refractivity. The first refractivity is less than or equal to the third refractivity. A material of the optical conversion layer is one of quantum dots, phosphor, or perovskite.

In the optical conversion structure of the embodiment of the present disclosure, a thickness of the optical conversion layer ranges from 190 nm to 240 nm.

In the optical conversion structure of the embodiment of the present disclosure, the first optical conversion unit emits a red light, the second optical conversion unit emits a green light, and the third optical conversion unit emits a blue light.

In the optical conversion structure of the embodiment of the present disclosure, a material of the first optical conversion unit is red quantum dots, a material of the second optical conversion unit is green quantum dots, and a material of the third optical conversion unit is blue quantum dots.

An embodiment of the present disclosure provides the other optical conversion structure. The optical conversion structure comprises a base layer comprising a first refractivity, a middle layer disposed on the base layer and comprising a second refractivity, and an optical conversion layer, which is a light-emitting side, disposed on the middle layer and comprising a third refractivity, wherein the optical conversion layer comprises a first optical conversion unit, a second optical conversion unit, and a third optical conversion unit, and the first optical conversion unit, the second optical conversion unit, and the third optical conversion unit have different light colors. The second refractivity is greater than the first refractivity, and the second refractivity is greater than the third refractivity.

In the optical conversion structure of the embodiment of the present disclosure, the first refractivity is less than or equal to the third refractivity.

In the optical conversion structure of the embodiment of the present disclosure, a material of the optical conversion layer is one of quantum dots, phosphor, or perovskite.

In the optical conversion structure of the embodiment of the present disclosure, the first optical conversion unit emits a red light, the second optical conversion unit emits a green light, and the third optical conversion unit emits a blue light.

In the optical conversion structure of the embodiment of the present disclosure, a material of the first optical conversion unit is red quantum dots, a material of the second optical conversion unit is green quantum dots, and a material of the third optical conversion unit is blue quantum dots.

In the optical conversion structure of the embodiment of the present disclosure, a thickness of the optical conversion layer ranges from 190 nm to 240 nm.

In the optical conversion structure of the embodiment of the present disclosure, the thickness of the optical conversion layer is 200 nm.

In the optical conversion structure of the embodiment of the present disclosure, the first optical conversion unit emits a red light, the second optical conversion unit emits a green light, and the third optical conversion unit emits a blue light.

An embodiment of the present disclosure further provides a display device. The display device comprises a backlight module and a liquid crystal cell, wherein the liquid crystal cell is disposed on a light-emitting side of the backlight module, the backlight module comprises a light source and an optical conversion structure disposed on a light-emitting side of the light source, and the light source is a blue light. The optical conversion structure comprises a base layer comprising a first refractivity, a middle layer disposed on the base layer and comprising a second refractivity, and an optical conversion layer, which is a light-emitting side, disposed on the middle layer and comprising a third refractivity, wherein the optical conversion layer comprises a first optical conversion unit, a second optical conversion unit, and a third optical conversion unit, and the first optical conversion unit, the second optical conversion unit, and the third optical conversion unit have different light colors. The second refractivity is greater than the first refractivity, and the second refractivity is greater than the third refractivity.

In the optical conversion structure of the embodiment of the present disclosure, the first refractivity is less than or equal to the third refractivity.

In the optical conversion structure of the embodiment of the present disclosure, a material of the optical conversion layer is one of quantum dots, phosphor, or perovskite.

In the optical conversion structure of the embodiment of the present disclosure, the first optical conversion unit emits a red light, the second optical conversion unit emits a green light, and the third optical conversion unit emits a blue light.

In the optical conversion structure of the embodiment of the present disclosure, the first refractivity is less than or equal to the third refractivity.

In the optical conversion structure of the embodiment of the present disclosure, a material of the optical conversion layer is one of quantum dots, phosphor, or perovskite.

In the optical conversion structure of the embodiment of the present disclosure, the first optical conversion unit is a red optical conversion unit, the second optical conversion unit is a green optical conversion unit, and the third optical conversion unit is a blue optical conversion unit.

In the optical conversion structure of the embodiment of the present disclosure, the liquid crystal cell comprises an array substrate, a color film substrate, and a liquid crystal layer, and the liquid crystal layer is disposed between the array substrate and the color film substrate. The color film substrate comprises a substrate and an electrode layer disposed on the substrate.

In the optical conversion structure of the embodiment of the present disclosure, a thickness of the optical conversion layer ranges from 190 nm to 240 nm.

In the optical conversion structure of the present disclosure, a base layer is used as a light-entering side and an optical conversion layer is used as a light-emitting side. A second refractivity is greater than a first refractivity, so that a middle layer and the optical conversion layer form a light reflecting interface. When total internal reflection occurs, an evanescent wave of light entering the optical conversion layer may excite the optical conversion layer to radiate fluorescence. Therefore, light conversion efficiency of the optical conversion layer is improved by an effect of the evanescent wave.

BRIEF DESCRIPTION OF THE SEVERAL VIEWS OF THE DRAWINGS

In order to more clearly illustrate the technical solutions of the embodiments of the present invention, the drawings used in the description of the embodiments will be briefly described as below. Obviously, the drawings described as below are just some embodiments of the present invention. For one of ordinary skill in the art, under the premise of no creative labor, other drawings can also be obtained according to these drawings.

DESCRIPTION OF SPECIFIC EMBODIMENTS OF THE INVENTION

Figure 1:
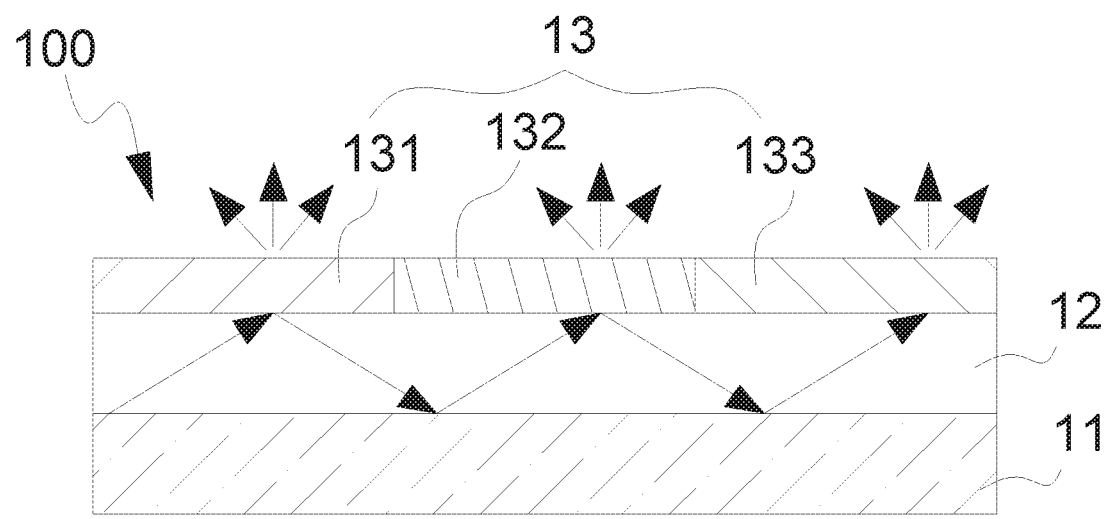
FIG. 1 is a schematic structural diagram of an optical conversion structure of an embodiment in the present disclosure.

Referring to the drawings, wherein the same component symbols represent the same components. The following description is based on the exemplified specific embodiments of the present disclosure, it should not be construed as limiting other specific embodiments not detailed herein.

Referring to FIG. 1, FIG. 1 is a schematic structural diagram of an optical conversion structure of an embodiment in the present disclosure. An optical converting structure 100 of an embodiment of the present disclosure is used for light-emitting or/and displaying. When the embodiment is applied in the display technology field, a light received by the optical converting structure 100 is preferably a light having a narrow spectral width, such as blue light. When the light is radiated to the optical converting structure 100 of the embodiment, the optical converting structure 100 may emit the light with the narrow spectral width to obtain a high color gamut effect. Wherein, the optical converting structure may be applied in backlights, color film substrates, liquid crystal display panels, organic light-emitting diode display panels, light-emitting diode display panels, and so on.

The optical conversion structure 100 of the embodiment comprises a base layer 11, a middle layer 12, and an optical conversion layer 13, which are arranged in order.

The base layer 11 is a light-entering side and has a first refractivity $n1$. The middle layer 12 is disposed on the base layer 11 and has a second refractivity $n2$. In other embodiments, the light-entering side of the optical conversion structure 100 may be on both sides, that is, the side of the optical conversion structure 100 is used as the light-entering side, for example, the side of the middle layer 12 is used as the light-entering side.

The optical conversion layer 13 is a light-emitting side. The optical conversion layer 13 is disposed on the middle layer 12 and has a third refractivity $n3$. The optical conversion layer 13 comprises a first optical conversion unit 131, a second optical conversion unit 132, and a third optical conversion unit 133. The first optical conversion unit 131, the second optical conversion unit 132, and the third optical conversion unit 133 convert light to emit light of different colors.

The second refractivity $n2$ is greater than the first refractivity $n1$, and the second refractivity $n2$ is greater than the third refractivity $n3$.

In the optical conversion structure 100 of the present disclosure, the second refractivity $n2$ is set to be greater than the first refractivity $n1$. When incident angles of light are greater than critical angles of total internal reflection, total internal reflection occurs at an interface between the middle layer 12 and the optical conversion layer 13. However, in fact, the light radiates to the optical conversion layer 13 and before reflection, its light energy will enter the optical conversion layer 13 to a certain depth, and a light wave propagating into the optical conversion layer 13 is an evanescent wave. At this time, the evanescent wave excites the optical conversion layer 13 and causes the optical conversion layer 13 to radiate fluorescence. For example, if the first optical conversion unit is formed of a red material, it emits red light.

Optionally, a material of the optical conversion layer is one of quantum dots, phosphor, or perovskite. In the optical conversion layer 13 of the present disclosure, the material of the optical conversion layer 13 is quantum dots. The evanescent wave in a quantum dot film (optical conversion layer 13) has a depth of about 200 nm. Thus, a thickness of the quantum dot film layer (optical conversion layer 13) may range from 190 nm to 240 nm. Preferably, the thickness of the optical conversion layer 13 is 200 nm.

Therefore, compared with the prior art quantum dot film layer used in the display field, the optical conversion structure 100 of the embodiment sets the second refractivity $n2$ to be greater than the first refractivity $n1$, which reduces a required quantum dot film layer thickness.

In addition, in the optical conversion structure 100 of the embodiment, after optical conversion with the optical conversion layer 13, remaining light will return to the middle layer 12 according to the law of reflection. Since the second refractivity n2 is set to be greater than the third refractivity n3, a reflected light is totally internally reflected at an interface between the middle layer 12 and the base layer 11. Thus, the light is directed to the optical conversion layer 13 again, and the light optical conversion 13 is excited for the second time, which improves light utilization rate.

Further, the first refractivity n1 is less than or equal to the third refractivity n3. This arrangement prevents a very small portion of light reflected from the interface between the middle layer 12 and the optical conversion layer 13 from passing through the base layer 11. In other words, it ensures that the light reflected from the interface between the middle layer 12 and the optical conversion layer 13 undergoes total internal reflection at the interface between the middle layer 12 and the base layer 11, and forms a light guide effect similar to a slab waveguide, further improving utilization of light.

In the optical conversion structure 100 of the embodiment of the present disclosure, the first optical conversion unit 131 emits a red light, the second optical conversion unit 132 emits a green light, and the third optical conversion unit 133 emits a blue light. Specifically, a material of the first optical conversion unit 131 is red quantum dots, a material of the second optical conversion unit 132 is green quantum dots, and a material of the third optical conversion unit 133 is blue quantum dots.

Figure 2:
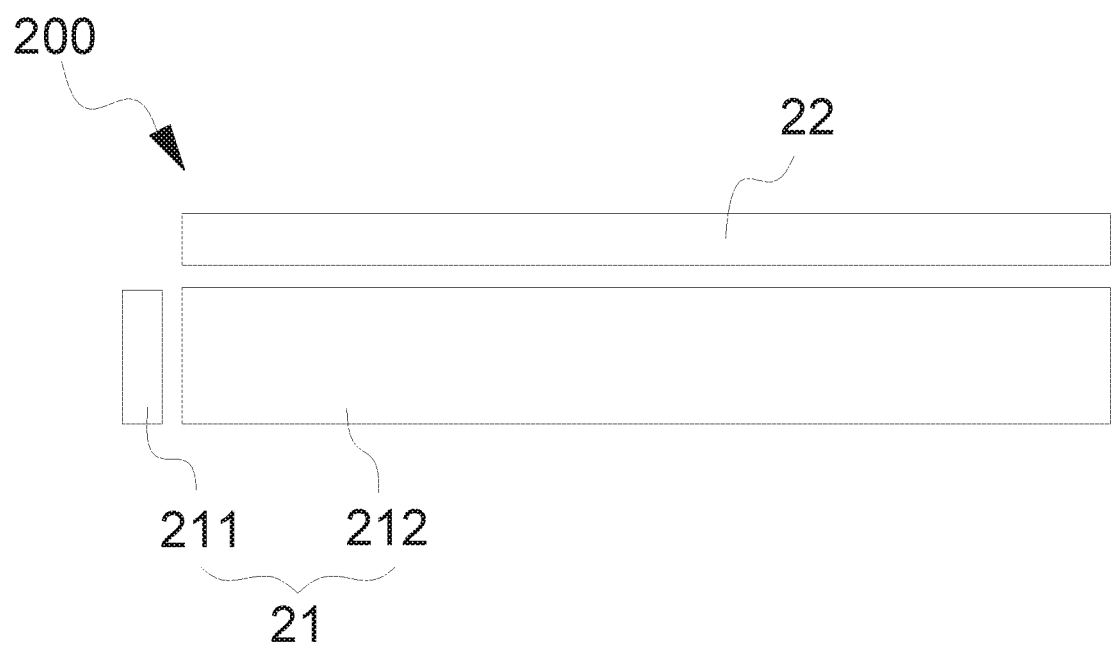
FIG. 2 is a schematic structural diagram of a display device of the embodiment in the present disclosure.

Referring to FIG. 2, a display device 200 of an embodiment of the present disclosure comprises a backlight module 21 and a liquid crystal cell 22. The liquid crystal cell 22 is disposed on a light-emitting side of the backlight module 21. The backlight module 21 comprises a light source 211 and an optical conversion structure 212 disposed on a light-emitting side of the light source 211. The light source 211 is a blue light.

The optical conversion structure 212 is a side-light-entering structure. The optical conversion structure 212 of the embodiment comprises a base layer, a middle layer, and an optical conversion layer, which are arranged in order.

The base layer has a first refractivity n1. The middle layer is disposed on the base layer and has a second refractivity n2.

The optical conversion layer is a light-emitting side. The optical conversion layer 13 is disposed on the middle layer 12 and has a third refractivity n3. The optical conversion layer comprises a first optical conversion unit, a second optical conversion unit, and a third optical conversion unit. The first optical conversion unit, the second optical conversion unit, and the third optical conversion unit convert light to emit light of different colors.

The second refractivity n2 is greater than the first refractivity n1, and the second refractivity n2 is greater than the third refractivity n3.

Optionally, a material of the optical conversion layer is one of quantum dots, phosphor, or perovskite. In the display device 200 of the embodiment, the material of the optical conversion layer is quantum dots. The evanescent wave in a quantum dot film (optical conversion layer) has a depth of about 200 nm. Thus, a thickness of the quantum dot film layer (optical conversion layer) may range from 190 nm to 240 nm. Preferably, the thickness of the optical conversion layer is 200 nm.

Further, the first refractivity n1 is less than or equal to the third refractivity n3.

In the display device 200 of the embodiment of the present disclosure, the first optical conversion unit is a red optical conversion unit, the second optical conversion unit is a green optical conversion unit, and the third optical conversion unit is a blue optical conversion unit.

The first optical conversion unit emits a red light, the second optical conversion unit emits a green light, and the third optical conversion unit emits a blue light. Specifically, a material of the first optical conversion unit is red quantum dots, a material of the second optical conversion unit is green quantum dots, and a material of the third optical conversion unit is blue quantum dots.

Figure 3:
FIG. 3 is a schematic structural diagram of a liquid crystal cell of the display device of the embodiment in the present disclosure.

Referring to FIG. 3, the liquid crystal box 22 comprises an array substrate 221, a color film substrate 222, and a liquid crystal layer 223. The liquid crystal layer 223 is disposed between the array substrate 221 and the color film substrate 222. The color film substrate 222 comprises a substrate and an electrode layer disposed on the substrate. Since the backlight module 21 comprises the optical converting structure 212, and the optical converting structure 212 has a function of filtering light to emit three colors of light, the role of the optical converting layer in the optical converting structure 212 is equivalent to a color film layer of a color film substrate of the prior art. That is, the color film substrate 222 of the display device 200 of the embodiment does not comprise a color film layer.

Thus, the optical conversion structure 212 as a backlight not only saves light guide plates, but also replaces the color film layer of the color film substrate of the prior art.

The optical conversion structure 212 of the display device 200 of the embodiment is same as the optical conversion structure 100 of the above embodiment. For details, refer to the description of the optical conversion structure 100 of the foregoing embodiment, and details are not described herein again.

As mentioned above, for those of ordinary skill in the art, various other corresponding changes and modifications can be made according to the technical solutions and technical concepts of the present disclosure, and all these changes and modifications should belong to the protection scope of the claims attached to the present disclosure.

What is claimed is:

1. An optical conversion structure, which is used for light-emitting or/and displaying, comprising:
    a base layer comprising a first refractivity;
    a middle layer disposed on the base layer and comprising a second refractivity; and
    an optical conversion layer, which is a light-emitting side, disposed on the middle layer and comprising a third refractivity, wherein the optical conversion layer comprises a first optical conversion unit, a second optical conversion unit, and a third optical conversion unit, and the first optical conversion unit, the second optical conversion unit, and the third optical conversion unit have different light colors;
    wherein the second refractivity is greater than the first refractivity, and the second refractivity is greater than the third refractivity;
    the first refractivity is less than or equal to the third refractivity; and
    a material of the optical conversion layer is one of quantum dots, phosphor, or perovskite.

2. The optical conversion structure as claimed in claim 1, wherein a thickness of the optical conversion layer ranges from 190 nm to 240 nm.

3. The optical conversion structure as claimed in claim 1, wherein the first optical conversion unit emits a red light, the second optical conversion unit emits a green light, and the third optical conversion unit emits a blue light.

4. The optical conversion structure as claimed in claim 3, wherein a material of the first optical conversion unit is red quantum dots, a material of the second optical conversion unit is green quantum dots, and a material of the third optical conversion unit is blue quantum dots.

5. An optical conversion structure, which is used for light-emitting or/and displaying, comprising:
 a base layer comprising a first refractivity;
 a middle layer disposed on the base layer and comprising a second refractivity; and
 an optical conversion layer, which is a light-emitting side, disposed on the middle layer and comprising a third refractivity, wherein the optical conversion layer comprises a first optical conversion unit, a second optical conversion unit, and a third optical conversion unit, and the first optical conversion unit, the second optical conversion unit, and the third optical conversion unit have different light colors;
 wherein the second refractivity is greater than the first refractivity, and the second refractivity is greater than the third refractivity.

6. The optical conversion structure as claimed in claim 5, wherein the first refractivity is less than or equal to the third refractivity.

7. The optical conversion structure as claimed in claim 5, wherein a material of the optical conversion layer is one of quantum dots, phosphor, or perovskite.

8. The optical conversion structure as claimed in claim 5, wherein the first optical conversion unit emits a red light, the second optical conversion unit emits a green light, and the third optical conversion unit emits a blue light.

9. The optical conversion structure as claimed in claim 8, wherein a material of the first optical conversion unit is red quantum dots, a material of the second optical conversion unit is green quantum dots, and a material of the third optical conversion unit is blue quantum dots.

10. The optical conversion structure as claimed in claim 5, wherein a thickness of the optical conversion layer ranges from 190 nm to 240 nm.

11. A display device, comprising a backlight module and a liquid crystal cell, wherein the liquid crystal cell is disposed on a light-emitting side of the backlight module, the backlight module comprises a light source and an optical conversion structure disposed on a light-emitting side of the light source, and the light source is a blue light;
 wherein the optical conversion structure comprises:
 a base layer comprising a first refractivity;
 a middle layer disposed on the base layer and comprising a second refractivity; and
 an optical conversion layer, which is a light-emitting side, disposed on the middle layer and comprising a third refractivity, wherein the optical conversion layer comprises a first optical conversion unit, a second optical conversion unit, and a third optical conversion unit, and the first optical conversion unit, the second optical conversion unit, and the third optical conversion unit have different light colors;
 wherein the second refractivity is greater than the first refractivity, and the second refractivity is greater than the third refractivity.

12. The display device as claimed in claim 11, wherein the first refractivity is less than or equal to the third refractivity.

13. The display device as claimed in claim 11, wherein a material of the optical conversion layer is one of quantum dots, phosphor, or perovskite.

14. The display device as claimed in claim 11 wherein the first optical conversion unit is a red optical conversion unit, the second optical conversion unit is a green optical conversion unit, and the third optical conversion unit is a blue optical conversion unit.

15. The display device as claimed in claim 14, wherein the liquid crystal cell comprises an array substrate, a color film substrate, and a liquid crystal layer, and the liquid crystal layer is disposed between the array substrate and the color film substrate; and
 the color film substrate comprises a substrate and an electrode layer disposed on the substrate.

16. The display device as claimed in claim 11, wherein a thickness of the optical conversion layer ranges from 190 nm to 240 nm.

\* \* \* \* \*